US011820460B2

(12) United States Patent
Ricco et al.

(10) Patent No.: US 11,820,460 B2
(45) Date of Patent: Nov. 21, 2023

(54) VEHICLE POWER-ASSIST DRIVE SYSTEMS

(71) Applicant: Bimotal Inc., San Francisco, CA (US)

(72) Inventors: Tobias Sebastian Ricco, San Francisco, CA (US); Amir Kalantari, Oakland, CA (US)

(73) Assignee: Bimotal Inc., Berkeley, CA (US)

( * ) Notice: Subject to any disclaimer, the term of this patent is extended or adjusted under 35 U.S.C. 154(b) by 412 days.

(21) Appl. No.: 17/010,757

(22) Filed: Sep. 2, 2020

(65) Prior Publication Data

US 2021/0061409 A1    Mar. 4, 2021

Related U.S. Application Data

(60) Provisional application No. 62/895,286, filed on Sep. 3, 2019.

(51) Int. Cl.
*B62M 6/45* (2010.01)
*B62M 6/90* (2010.01)
(Continued)

(52) U.S. Cl.
CPC ................ *B62M 6/45* (2013.01); *B62J 43/13* (2020.02); *B62K 3/00* (2013.01); *B62L 1/005* (2013.01);
(Continued)

(58) Field of Classification Search
CPC . B62M 6/45; B62M 6/90; B62M 7/00; B62M 11/04; B62M 11/02; B62M 6/60;
(Continued)

(56) References Cited

U.S. PATENT DOCUMENTS 7,108,097 B1   9/2006  Bolton et al.
9,359,040 B2   6/2016  Muehlbauer
(Continued)

FOREIGN PATENT DOCUMENTS

CA    2162504 A1   5/1997
CN    202295198 U  7/2012
(Continued)

OTHER PUBLICATIONS

International Searching Authority, International Search Report and Written Opinion for PCT/US2020/049084 filed Sep. 2, 2020; dated Nov. 10, 2020, 11 pages.
(Continued)

*Primary Examiner* — Kevin Hurley
*Assistant Examiner* — Marlon A Arce
(74) *Attorney, Agent, or Firm* — Pillsbury Winthrop Shaw Pittman LLP

(57) ABSTRACT

A power-assist drive system for a vehicle (e.g., a bicycle) is provided. The system includes a drive unit assembly attached to a frame of a vehicle and a motor having an output shaft, and a drive gear rotatably associated with the output shaft. The system further includes a driven unit assembly including a driven gear configured to be attached to a wheel hub of the vehicle, and a brake disc coaxially attached to the driven gear. The drive gear may be configured to operably engage the driven gear to transmit power from the motor to the wheel hub. A brake caliper may be integrated with the drive unit assembly. The system may further include a battery and a speed controller configured to receive an input signal to selectively direct electrical power from the battery to the motor to drive the wheel via the drive gear and the driven gear.

32 Claims, 14 Drawing Sheets

(51) Int. Cl.
  *B62M 11/04* (2006.01)
  *B62M 7/00* (2010.01)
  *B62K 3/00* (2006.01)
  *B62J 43/13* (2020.01)
  *B62L 1/00* (2006.01)

(52) U.S. Cl.
  CPC .............. *B62M 6/90* (2013.01); *B62M 7/00* (2013.01); *B62M 11/04* (2013.01)

(58) Field of Classification Search
  CPC ........ B62J 43/13; B62K 3/00; B62K 2206/00; B62L 1/005
  See application file for complete search history.

(56) References Cited

U.S. PATENT DOCUMENTS

| | | | |
|---|---|---|---|
| 11,485,235 B2* | 11/2022 | Then-Gautier | ........... B60L 7/24 |
| 11,492,074 B2* | 11/2022 | Saiki | ........................ B62M 6/60 |
| 2001/0030086 A1 | 10/2001 | Lumpkin et al. | |
| 2003/0111284 A1* | 6/2003 | Chou | ........................ B62M 6/60 |
| | | | 180/220 |
| 2007/0222170 A1 | 9/2007 | Sasnowski et al. | |
| 2010/0117327 A1 | 5/2010 | Hadley | |
| 2011/0001442 A1 | 1/2011 | Lee et al. | |
| 2011/0284303 A1 | 11/2011 | Shwartz | |
| 2015/0158550 A1 | 6/2015 | Kawakami et al. | |
| 2015/0369316 A1 | 12/2015 | Muehlbauer | |
| 2019/0003534 A1 | 1/2019 | Rodriguez | |
| 2020/0079470 A1* | 3/2020 | Saiki | ........................ B62K 19/38 |
| 2020/0283093 A1* | 9/2020 | Saiki | ........................ B62M 6/60 |

FOREIGN PATENT DOCUMENTS

| | | |
|---|---|---|
| CN | 108349373 A | 7/2018 |
| DE | 102012205841 A1 | 10/2013 |
| DE | 202016104737 U1 | 9/2016 |
| EP | 2228293 A2 | 9/2010 |
| GB | 2453039 A | 3/2009 |
| KR | 20160056732 A | 5/2016 |
| RU | 179351 U1 | 5/2018 |

OTHER PUBLICATIONS

Extended European Search Report issued in EP Application No. 20861105.3, dated Sep. 25, 2023, pp. 1-16.

* cited by examiner

VEHICLE POWER-ASSIST DRIVE SYSTEMS

CROSS-REFERENCE TO RELATED APPLICATION

This application claims priority to U.S. Provisional Application No. 62/895,286, filed Sep. 3, 2019 which is hereby incorporated by reference in its entirety.

TECHNICAL FIELD

The present disclosure is directed generally to power-assist systems for vehicles and, more particularly, to power-assist systems for transmission of power from a drive unit to a driven wheel of a vehicle (e.g., a bicycle).

BACKGROUND

Human-powered vehicles, such as bicycles, can include power-assist systems driven by electric motors, which relieve the user of exerting the full power necessary to propel the vehicle. Such power-assist systems can provide a range of partial assistance, or can provide power to fully propel the vehicle without user contribution. The systems are generally integrated into the vehicle by having a drive unit input power to a component of the drivetrain of the vehicle, such as the tire, wheel hub, crankset, etc., while mounting other components of the power-assist system to the frame or other components of the vehicle.

Examples of conventional power-assist systems for bicycles include mid-drive, hub-drive, and friction-drive systems. In a conventional mid-drive power-assist system, the power from the drive unit is transferred to the crankset of the bicycle to drive the rear wheel through the drivetrain. The mid-drive power-assist systems are typically difficult to retrofit onto a non-power-assisted bicycle and can render the vehicle inoperable should a failure of the power-assist system occur. Since the drive unit is acting on the crankset, the user must also pedal in conjunction with the mid-drive system. In hub-drive power-assist systems, the power from the drive unit is transferred to the hub of the bicycle wheel for direct power delivery to the driven wheel without transfer through the drivetrain of the vehicle. Such systems have limited gearing and wheel size options, and include a rotating mass having high rotational inertia, which adversely impacts braking, acceleration, top speed, and uphill power consumption, as well as usability of the bicycle when unpowered. In a friction-drive power-assist system, a friction roller provides power input directly to the tire of the driven wheel. Such systems are generally incompatible with heavily treaded tires, e.g., mountain bike tires, are limited in the amount of torque that can be transferred based on the friction between the friction roller and the tire, and are inefficient due to frictional losses.

DETAILED DESCRIPTION

Figure 1A:
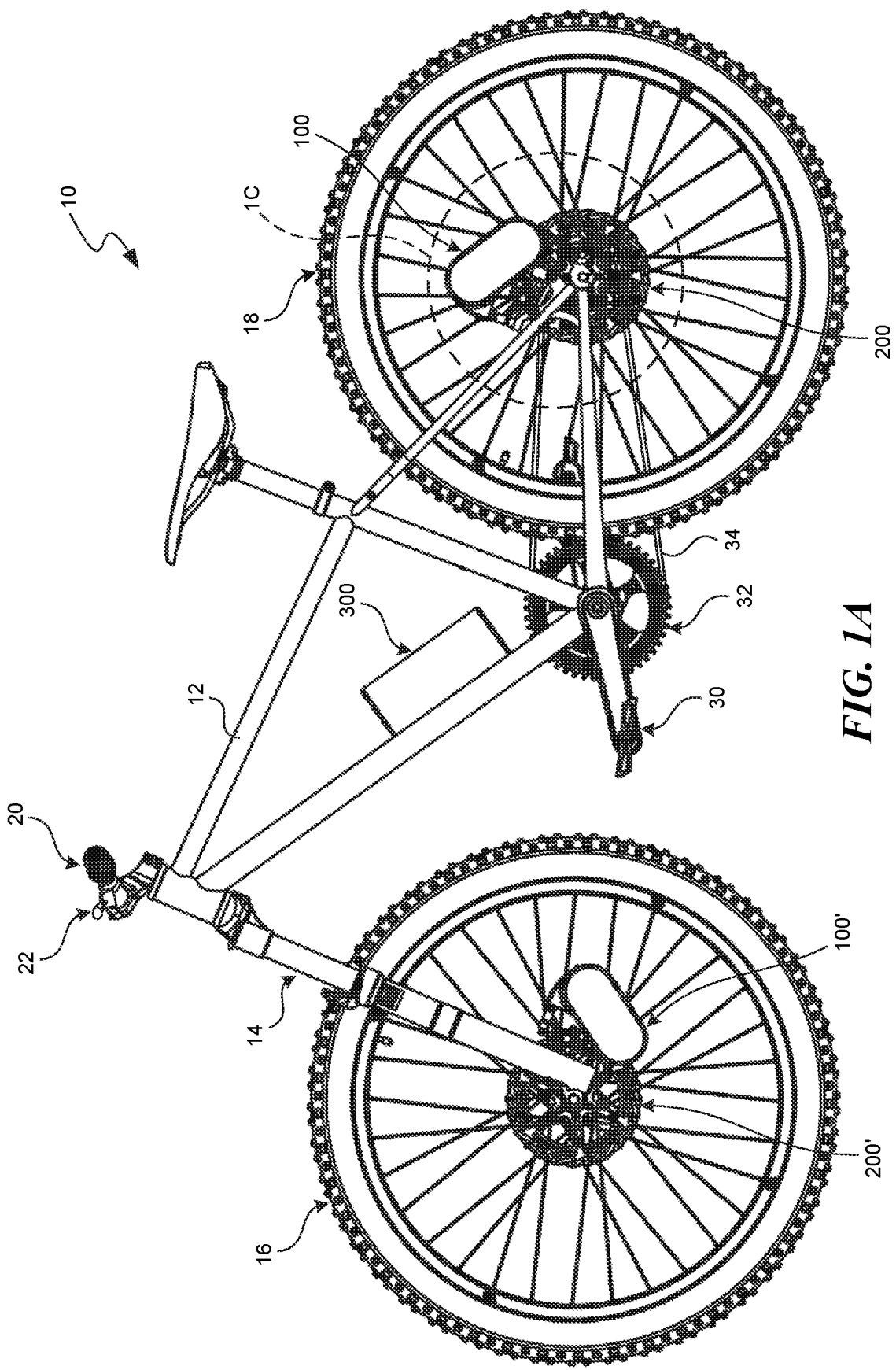
FIG. 1A is a left side view and FIG. 1B is a top rear left isometric view of a vehicle having a power-assist drive system configured in accordance with embodiments of the present technology.

The following disclosure describes various embodiments of power-assist drive systems and components for use on bicycles and/or other vehicles. Such drive systems can be included with the vehicle at the point-of-sale, added by a dealer prior to delivering the vehicle, or retrofitted to an existing vehicle. Embodiments of the power-assist drive system are generally configured to drive one or more wheels of the vehicle by operably engaging with a driven gear attached to a component of the driven wheel to assist the user during operation. In some embodiments, power-assist drive systems of the present technology are configured for use with human-powered vehicles, such as bicycles, tricycles, scooters, garden equipment, small cars, etc. In other embodiments, power-assist drive systems configured in accordance with the present technology can be used with other types of vehicles, such as electric scooters, carts, cars, etc. Accordingly, although the following description is generally directed to embodiments of power-assist drive systems for attachment to bicycles, the present technology is not limited to such vehicles and the systems described herein are suitable for use with other types of vehicles.

As described in greater detail below, embodiments of the power-assist drive systems described herein include a drive unit configured to transmit power to rotate a driven wheel, a power source (e.g., a battery), a speed controller, and an operator input control (e.g. a throttle). In operation, the user varies the throttle position to send a signal to the speed controller communicating how much power assist is desired. The speed controller directs electrical power from the battery to the drive unit, which in turn drives the driven wheel. The drive unit may be mounted to or integrated into the frame, fork, or other suitable component of the bicycle and is located to interface with a driven gear that is operably coupled to the driven wheel. In some embodiments, the drive unit is attached to the bicycle using a quick-connect/disconnect ("quick-connect") system, such that the drive unit can be installed or removed quickly and without the use of tools, e.g., during a ride, in the event of a failure, etc. In other embodiments, the drive unit has one or more components that are integral to the vehicle (e.g., a housing integrated into the frame). In some embodiments, the drive unit has an output drive gear that rotatably engages the driven gear to rotate the driven wheel. The driven gear may be attached to a component of the driven wheel, such as a brake disc, the wheel hub, etc. For example, embodiments shown and described herein are directed to a driven gear combined with the brake disc (e.g., as a single unit, or an assembly); however, other mounting locations of the driven gear are also within the scope of the present technology, such as mounting directly to the wheel hub, to a bicycle gear or cassette, etc. Although helical gears are shown in the Figures, in other embodiments, spur gears, bevel gears, planetary, hypoid, spiral bevel, face, worm, or other suitable gear configurations are within the scope of the present technology. These gear types may be selected for drive ratio, reduced gear noise, durability, strength, etc.

The drive unit of the power-assist drive system includes an electric motor configured to receive power from the battery and transfer the power through a drivetrain to the driven gear to rotate the driven wheel. The motor may be a stepper motor, permanent magnet motor, AC induction motor, DC motor, or other suitable type of electric motor, and may have power output in the range of 50 Watts (W) to 2000 W, or greater than 2000 W. In some embodiments, the motor can include aluminum windings and stacked magnets (e.g., a Halbach array). The motor can have hall sensors for position sensing and speed control, and may be an inrunner-type motor our an outrunner-type motor.

The battery may be lithium-ion (Li-ion), nickel-metal hydride (NiMH), or other suitable battery technologies, and may have an energy capacity in a range from 50 Watt-hours (Wh) to 2000 Wh or greater, and between 20V and 60V by use of a DC/DC converter. The battery can include a suitable connection interface to power peripheral devices, such as charging a mobile phone (with micro USB, USB-C, etc.), powering a bicycle computer, light, or other device, etc. Embodiments of the system include a wiring harness to provide wire routing to each of the electrical components, and/or can include components configured for wireless communication protocols (e.g., BLUETOOTH®, ANT™, radio-frequency signals, etc.) for low power communications.

The drive unit may assist the user of the bicycle by providing a portion of the power required to propel the bicycle and user, or may provide enough power to fully propel the bicycle and user without user contribution (e.g., without pedaling). In other embodiments, the drive unit may fully power the vehicle where the user cannot provide power (such as in an electric scooter, cart, car, etc.). As described in detail below, the drive unit may have one or more protective coverings to encase the motor, the drivetrain, and other components of the drive unit and reduce the likelihood of damage or wear from contamination ingress, e.g., from dirt, water, etc. In some embodiments, the drive unit is configured to be suitably mounted to the bicycle to drive one or both of the front and rear wheels. In a front mounting location, the drive unit may be coupled to, e.g., a stanchion of the fork, and in the rear mounting location, the drive unit may be coupled to, e.g., the frame (e.g., to a flange attached to the upper or lower surface of the seat stay or chain stay portions of the frame). On bicycles with front and/or rear suspension, the drive unit is unsprung mass, while other components of the system, such as the battery and operator controls, are sprung mass.

The drive unit may be configured to provide a neutral input ("freewheel") when there is near zero throttle input and the bicycle is moving or the user is pedaling, or may include a regeneration feature to generate electrical power and charge the battery when the bicycle is coasting or the user is braking. Freewheeling can be achieved by adding a seed current to the motor to induce a creep torque on the motor such that the motor does not have a resistance against the user pedaling the bike. In this configuration, the motor speed can determine the amount of system drag torque and counteract the drag by applying the seed current. As an alternative that will be described below, one or more gears in the drivetrain may include a clutch to disconnect the drivetrain and allow freewheeling. Further, some embodiments of the power-assist drive system may include a sensor associated with the brake lever that sends a signal to cut power to the drive unit, e.g., to cut the power and thereby assist during braking or an emergency stop. Such a sensor can also provide a signal to engage a regeneration system for battery charging (e.g., by reversing the polarity of the motor). In some embodiments, the power-assist drive system may have a user control that is selectable between freewheeling and regeneration, for example, when a user does not want to recharge the battery, desires to coast without resistance, etc.

The driven gear and brake disc combination provides a power input component or assembly (the driven gear assembly) coupled to the wheel for receiving power from the output gear of the drive unit. The driven gear and brake disc combination may be a single component, e.g., machined or formed from a unitary piece of material, or may be an assembly with 2 or more components attached together. When the driven gear and brake disc combination is a single component, teeth of the driven gear may be included on the outer perimeter, inner perimeter, or side surface (e.g., either of the inner or outer side surfaces) of the brake disc; however, in other embodiments, the teeth of the driven gear may be arranged laterally relative to the brake disc. When the driven gear and brake disc combination is an assembly, the driven gear and the brake disc can be coaxially positioned such that one of the driven gear or the brake disc is positioned closer to the axial midpoint of the wheel. In these configurations, the brake caliper may be an integrated component with the drive unit, or separate from the drive unit. In the illustrated embodiments, a frame bracket mounts both the brake caliper and the drive unit to a single location on the frame; however, other mounting configurations are within the scope of the present technology.

Certain details are set forth in the following description and in FIGS. 1A-5 to provide a thorough understanding of various embodiments of the present technology. In other instances, well-known structures, systems, materials and/or operations often associated with bicycles, power-assist systems and associated components, electric motors, electric battery systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below. In the Figures, identical reference numbers identify identical, or at least generally similar, elements.

Figure 1B:
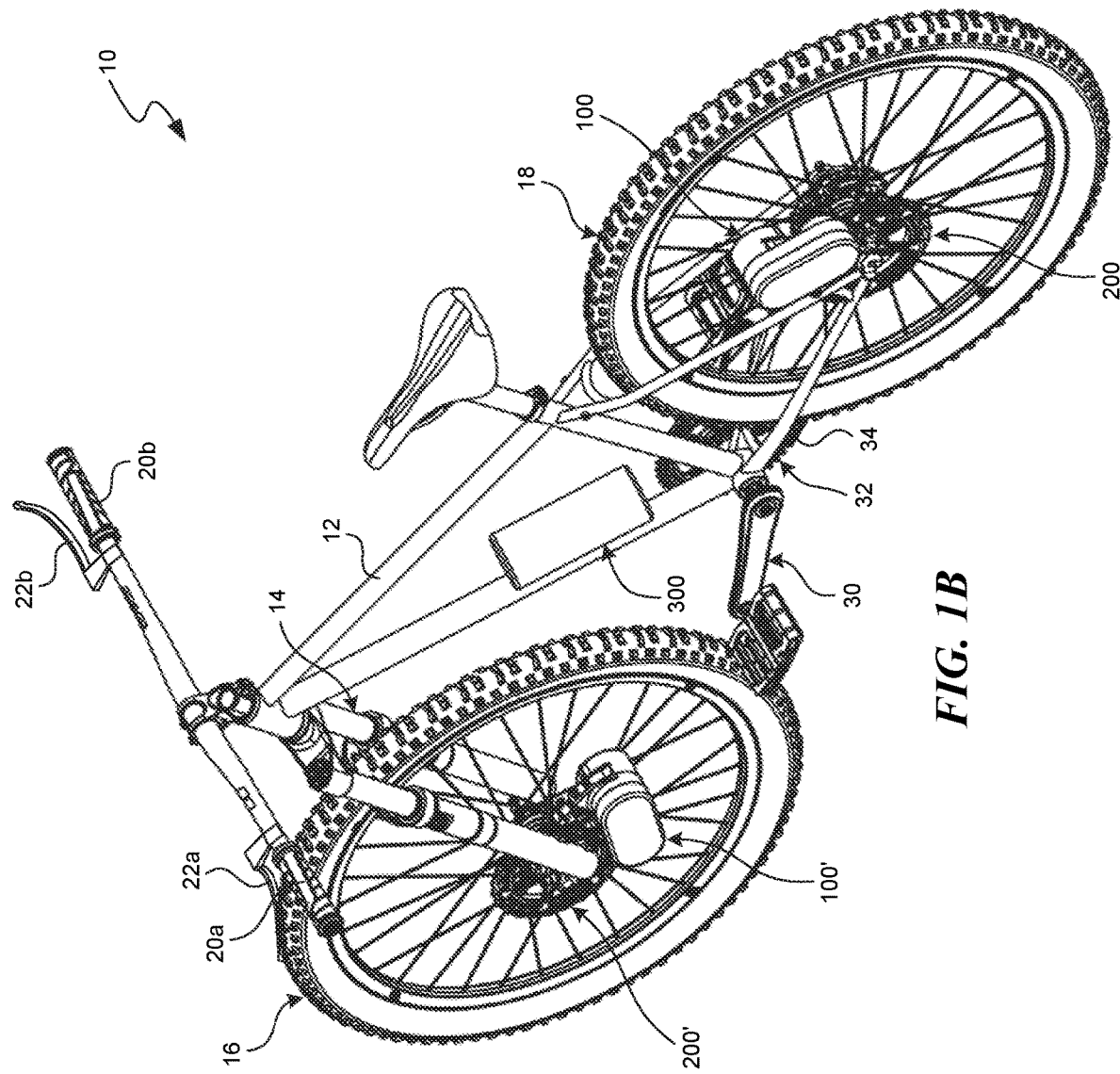

FIG. 1A is a left side elevation view and FIG. 1B is a top rear left isometric view of a power-assisted vehicle ("bicycle 10") configured in accordance with embodiments of the present technology. Although the bicycle 10 is depicted as a mountain bike for purposes of illustration, the present technology is not limited to use with such bicycle types and is similarly compatible with road bicycles, hybrid bicycles, downhill bicycles, etc. Referring to FIGS. 1A and 1B together, the bicycle 10 includes components of a power-assist drive system having a rear wheel drive unit assembly 100, a front wheel drive unit assembly 100', a rear wheel driven unit assembly 200, a front wheel driven unit assembly 200', and a battery 300 configured to provide power to the drive unit assemblies 100 and 100'. The bicycle 10 further includes a frame 12, forks 14, a front wheel 16, a rear wheel 18, a left grip 20a, a right throttle grip 20b that incorporates a speed control (e.g., a "throttle control"), a left brake lever 22a, a right brake lever 22b, a crank input assembly 30, a crankset 32, and a chain 34. The throttle control can be a twist type (motorcycle-style control), a lever (snowmobile-style control), a button, a dial, or any other suitable input device for motor speed control. In some embodiments, the speed control is configured to receive a signal from one or more pedal assist sensors configured to measure user input through the pedals, e.g., pedaling cadence and/or torque. In these embodiments, the drive unit assembly 100 can apply a proportional level of power-assist based on the signal from the pedal assist sensors without manual speed control input from the user. In the illustrated embodiment, the front drive unit assembly 100' is attached to the forks 14 and configured to provide rotational power to the front wheel 16 through the front driven unit assembly 200'. Similarly, the rear drive unit assembly 100 is attached to a rear portion of the frame 12 and configured to provide rotational power to the rear wheel 18 through the rear driven unit assembly 200.

Although the following disclosure provides a detailed description of the rear drive unit assembly 100 and the rear driven unit assembly 200, in some embodiments the components of the front drive unit assembly 100' and the front driven unit assembly 200' can be the same, or at least generally similar in structure and function to those of the rear drive unit assembly 100 and the rear driven unit assembly 100', respectively, but may be configured to provide rotational power to the front wheel 16. For example, in some embodiments the front drive unit assembly 100' and the front driven unit assembly 200' can be structurally and functionally identical to the rear drive unit assembly 100 and the rear driven unit assembly 100', respectively, and may only differ with respect to mounting brackets, etc. This commonality of componentry enables the units to be interchanged, reduces part counts, etc. In other embodiments, some components may have different shapes and/or dimensions to adapt to the front wheel configuration, but the structure and function of the front drive/driven unit assemblies 100'/200' are generally the same as the corresponding rear drive/driven unit assemblies 100/200. The bicycle 10 may have power-assist on a single wheel, e.g., the front or rear wheel, or may have power-assist on both wheels. In embodiments with drive unit assemblies 100 on both wheels, the user may have a manual control switch to select a mode where either of the wheels are driven separately, or the wheels are driven in combination at a variable ratio (e.g., the rear wheel having greater power-assist, the front wheel having greater power-assist, or a balanced power-assist). Some conventional components of the bicycle 10 (e.g., the handlebars, the seat, the drivetrain components, etc.) are not described in detail in the following disclosure to avoid unnecessarily obscuring the description of the various embodiments of the present technology.

Figure 1C:
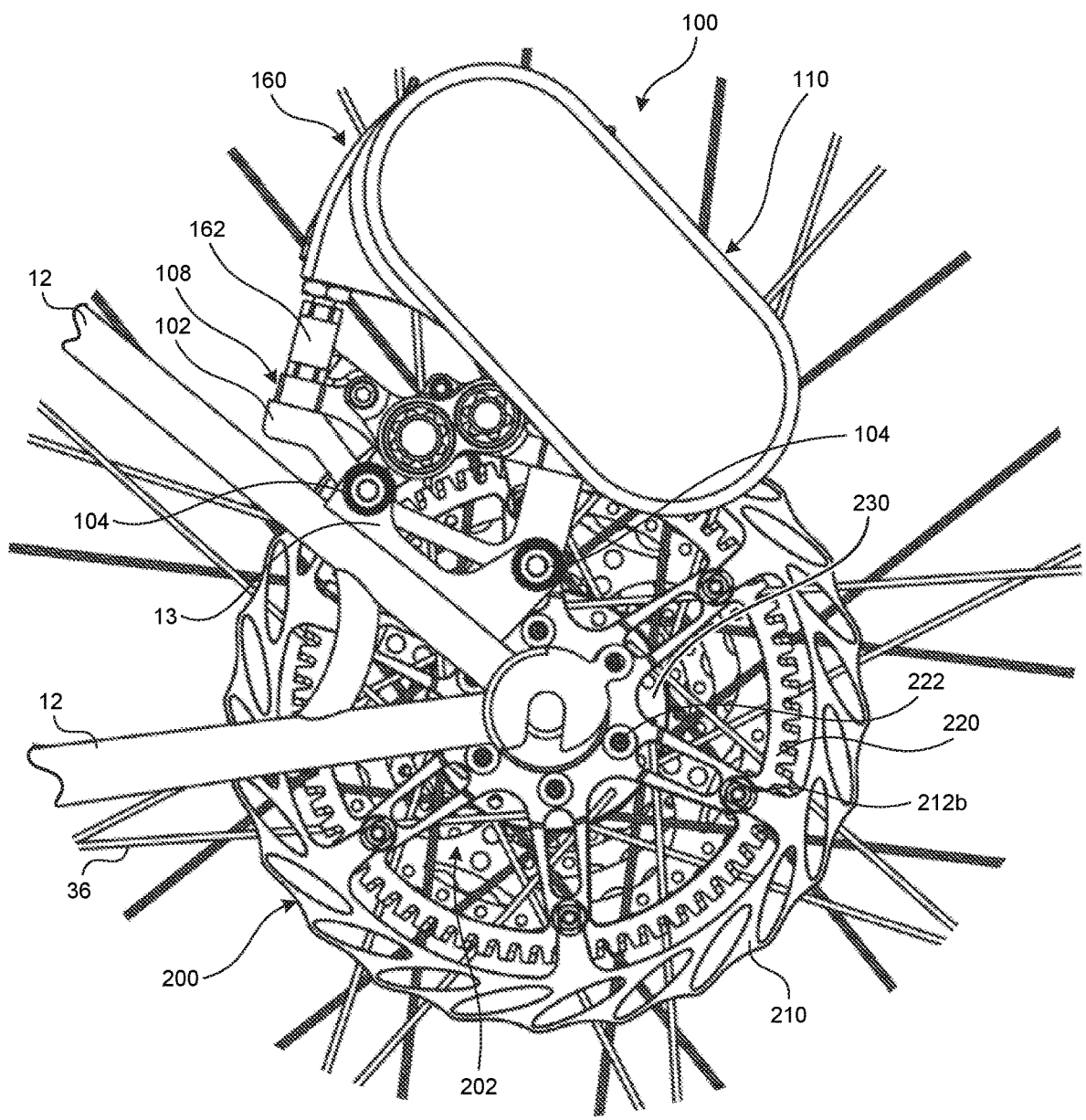
FIG. 1C is an enlarged left side view of components of the power-assist drive system shown within the detail boundary in FIG. 1A.

FIG. 1C is an enlarged left side view showing components of the rear drive unit assembly 100 (hereinafter "drive unit assembly 100") and the rear driven unit assembly 200 (hereinafter "driven unit assembly 200") of the bicycle 10 within the detail boundary in FIG. 1A. A lug or flange 13 is attached (e.g., welded) to a rear portion of the frame 12 (e.g., the seat stay, the chain stay, etc.) and configured to attach the drive unit assembly 100 to the frame 12 of the bicycle 10. The drive unit assembly 100 includes a frame bracket 102 which mounts to the flange 13 and is secured with two fasteners 104 (e.g., bolts). The drive unit assembly 100 further includes a brake caliper assembly 108 and a drive unit 110. The brake caliper assembly 108 is mounted to the frame bracket 102 with two quick-connect couplings 162 which are threadably attached to the frame bracket 102 (only one of the two quick-connect couplings 162 is visible in FIG. 1C). The drive unit 110 is mounted to the quick connect couplings 162 and secured with corresponding quick-connect assemblies 160 (only one of the two quick-connect assemblies 160a and 160b is visible in FIG. 1C) that releasably engage the quick-connect couplings 162. Components of the quick connect system (e.g., the quick-connect assemblies 160 and the quick connect couplings 162) are described in greater detail below with reference to FIG. 5A-5C. Although the following description and the Figures illustrate quick connect coupling arrangements throughout, in other embodiments, any suitable fastener or fastening scheme can be used to attach the components of the drive unit assembly 100 to the frame 12.

Still referring to FIG. 1C, the bicycle 10 may include a cassette 202 attached to the wheel hub 230 that has various-sized gears that are driven by the chain 34. A derailleur (not shown) may be used to transition the chain 34 between gears of the cassette 202 to change the gear ratio of the bicycle 10. The driven unit assembly 200 further includes a brake disc 210 fixedly attached to a driven gear 220 in a coaxial and/or concentric orientation with a plurality of fasteners 212b (e.g. bolts). The combination of the brake disc 210 and the driven gear 220 (e.g. a "driven unit") may be attached to a wheel hub 230 with a plurality of fasteners 222 (e.g., bolts). The wheel hub 230 carries the wheel rim and tire by means of a plurality of spokes 36 to form the wheel assembly (e.g., the rear wheel 18). The wheel assembly is rotatably mounted to the frame 12 by means of the hub 230.

Figure 2A:
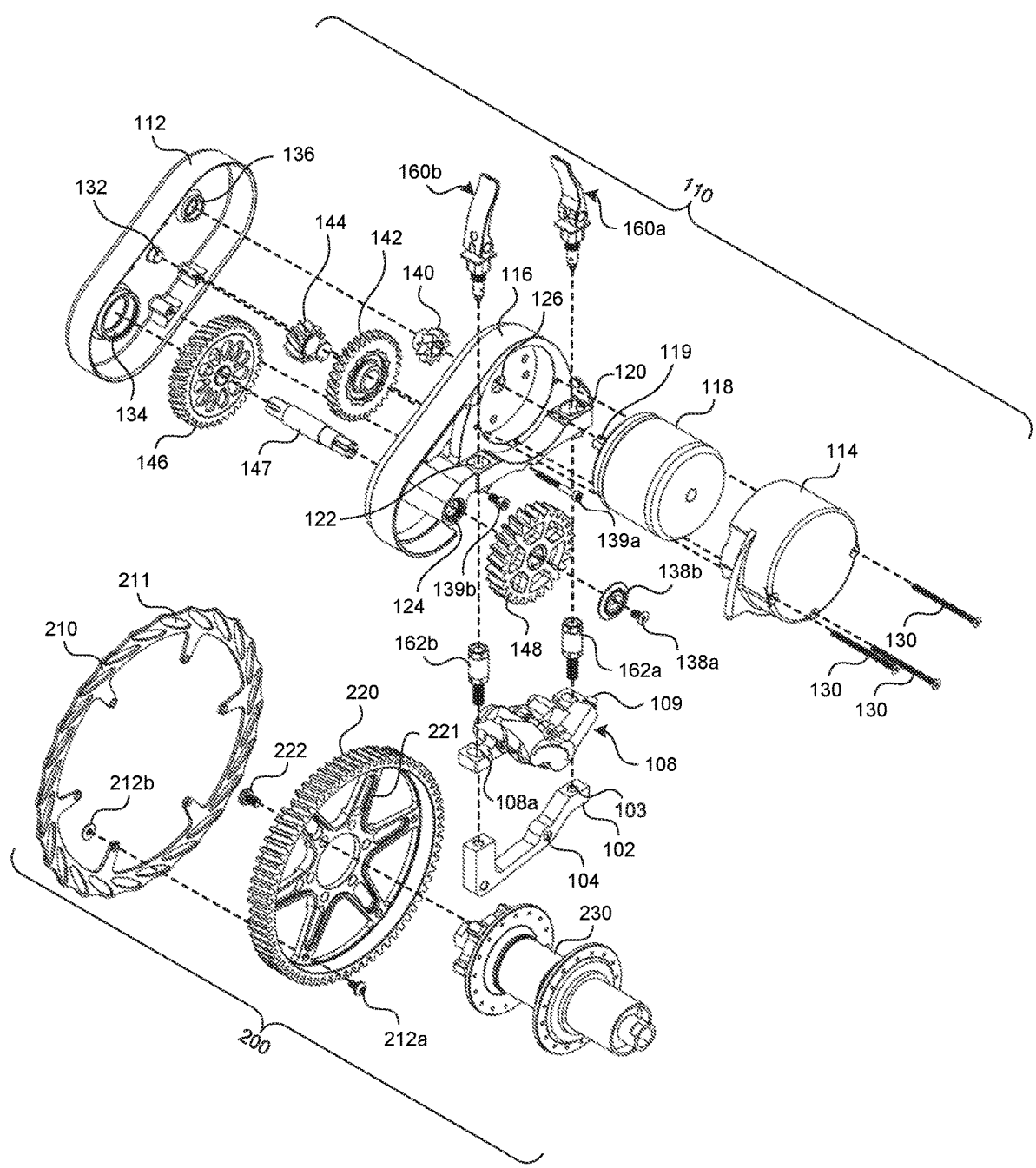
FIG. 2A is an exploded isometric view of a drive unit assembly and a driven unit assembly of the power-assist drive system of FIGS. 1A-1C, FIGS. 2B and 2C are top right side isometric and right side views, respectively, of the drive unit assembly and the driven unit assembly.
Figure 2B:
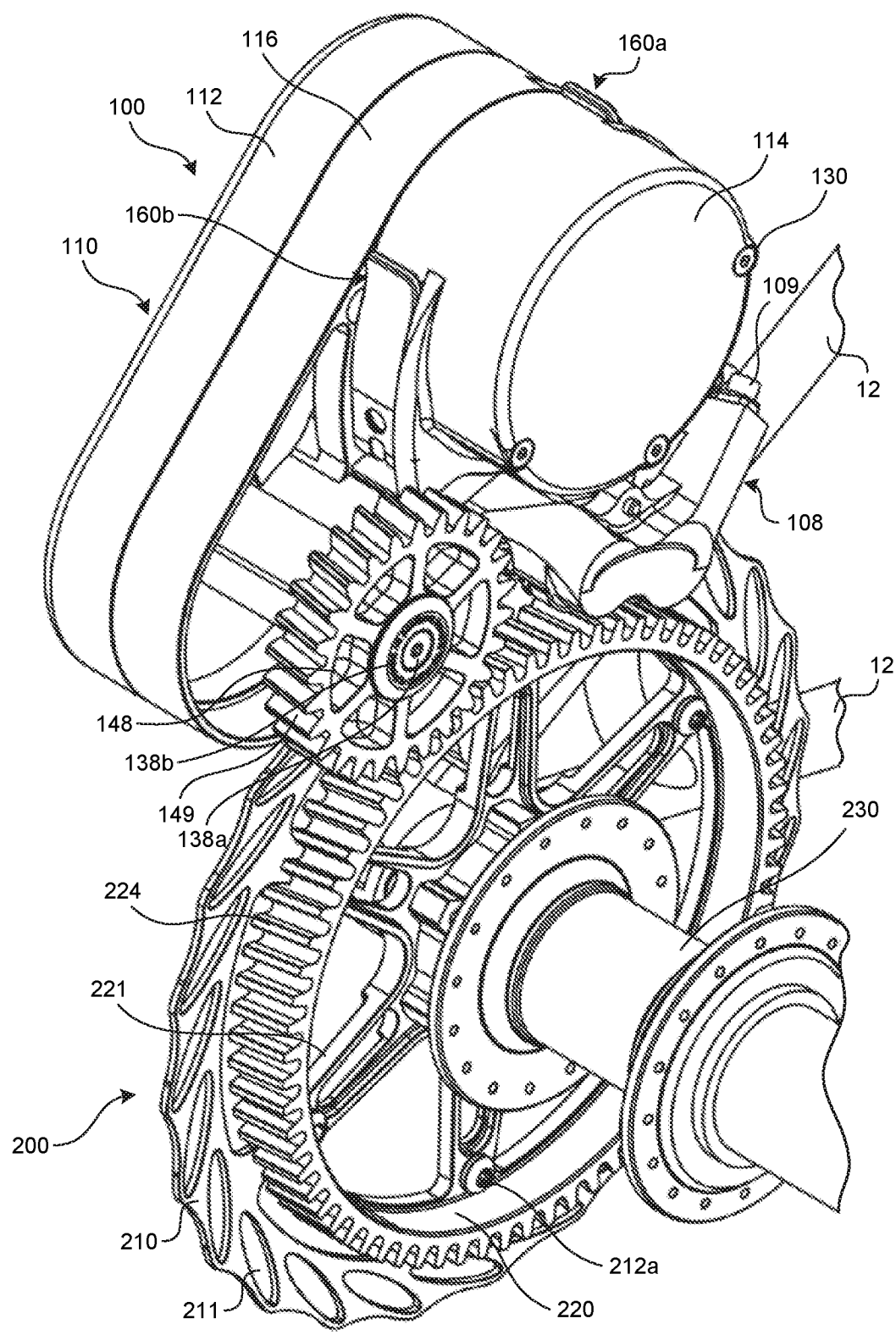
FIGS. 2D and 2E are bottom right side isometric and top left side isometric views, respectively, of the drive unit assembly.
Figure 2C:
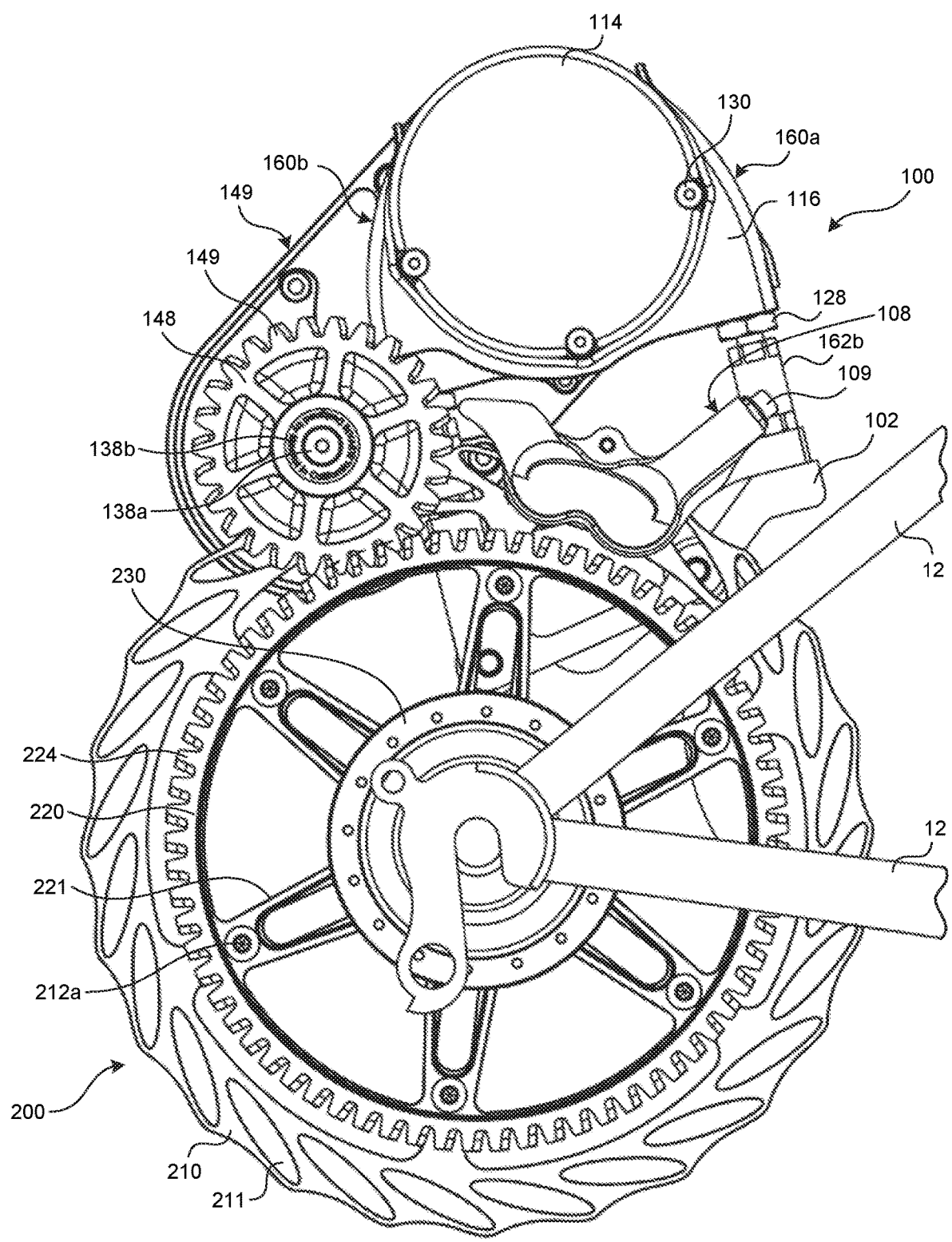
Figure 2D:
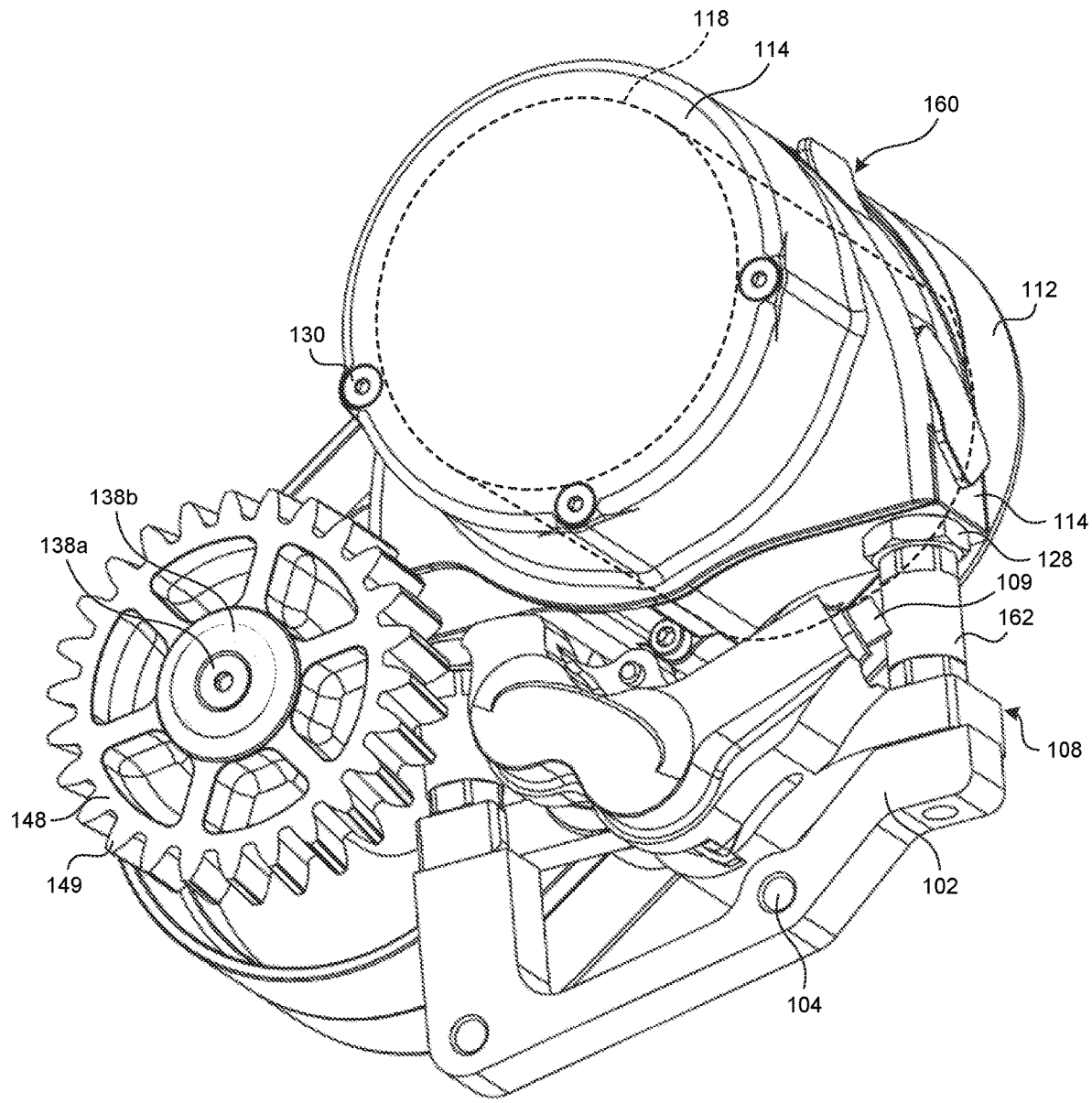
Figure 2E:
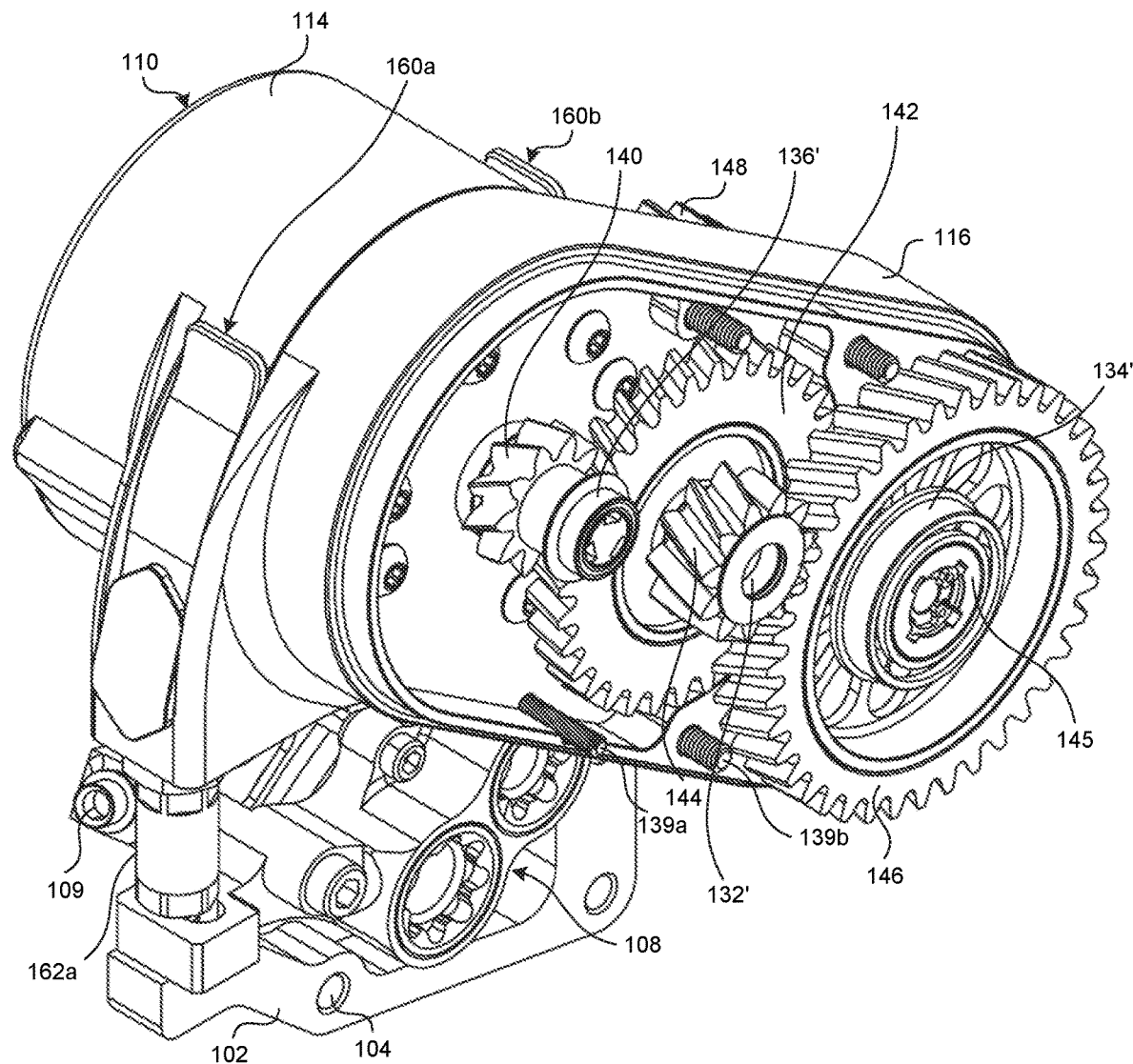

FIG. 2A is an exploded isometric view showing the drive unit assembly 100 and the driven unit assembly 200, FIGS. 2B and 2C are top right side isometric and right side views, respectively, of the drive unit assembly 100 and the driven unit assembly 200, and FIGS. 2D and 2E are bottom right side isometric and top left side isometric views, respectively, of the drive unit assembly 100. Referring to FIGS. 2A-2E together, the drive unit assembly 100 includes the frame bracket 102, the brake caliper assembly 108, the quick-connect couplings 162, and the quick-connect assemblies 160a, b securing the drive unit 110 to the frame bracket 102 through the quick connect couplings 162. In the illustrated embodiment, the brake caliper assembly 108 includes an input interface 109 configured to receive a hydraulic cable (not shown) such that the brake caliper assembly 108 is in hydraulic communication with the brake levers 22a and 22b (FIGS. 1A and 1B). In other embodiments, the brake caliper assembly 108 can be configured to actuate based on movement of a push-pull cable or an electrical signal via a wired input control. The frame bracket 102 may be formed from aluminum, magnesium, or other suitable metal that is cast, machined, forged, etc. In the illustrated embodiment, the frame bracket 102 is an International Standard (IS) mounting bracket. In other embodiments, the frame bracket can be a post mount, a flat mount, or other suitable mounting bracket type.

The drive unit 110 is coupled to the frame bracket 102 by means of the quick connect assemblies 160a, b which extend through a corresponding first drive unit aperture 120 and a second drive unit aperture 122. As will be explained in greater detail below with reference to FIG. 5A-5C, the quick-connect assemblies 160a, b may be threaded into a nut 128 (FIG. 2D) mounted to the drive unit 110 below the first and second drive unit apertures 120 and 122 and then releasably coupled to the corresponding quick connect couplings 162.

The drive unit 110 includes a housing 116 configured to mount various components of the drive unit 110. The housing 116 is configured to receive and support an electric motor 118 that powers the drive unit 110 and has an output shaft 119 that extends through an output shaft aperture 126 in the housing 116 and receives a pinion gear 140 fixedly attached thereto on the opposite side of the housing 116 from the motor 118. The motor 118 is mounted to the housing 116 and encased in a motor cover 114 which is attached to the housing 116 with fasteners 130 (e.g., screws). On the opposite side of the housing 116 from the motor cover 114, a drivetrain cover 112 is configured to enclose the various drive gears of the drive unit 110 and protect the internal components from dust and debris, and for safety considerations. The drivetrain cover 112 may be coupled to the housing 116 with various fasteners, such as fasteners 139a and 139b. The drivetrain cover 112 includes a first cylindrical flange having an interior bearing surface 136 (FIG. 2A) that receives an exterior bearing surface 136' (FIG. 2E) on the pinion gear 140 to stabilize its rotation during operation of the drive unit 110. In some embodiments, the housing 116 may be formed from aluminum, magnesium, or other suitable metal that is cast, machined, forged, stamped or otherwise formed to shape. The motor cover 114 and the drivetrain cover 112 may be formed from polycarbonate (PC), nylon, etc. and may include a strengthening material such as fiberglass or carbon fiber.

The teeth on the pinion gear 140 mesh with the teeth on a first intermediate gear 142, which is rotationally and coaxially fixed to a second intermediate gear 144, together forming a reduction gearset (FIGS. 2A and 2E). The drivetrain cover 112 further includes a cylindrical boss having an exterior bearing surface 132 (FIG. 2A) that is received in a central bore in 132' in the second intermediate gear 144 (FIG. 2E) to stabilize its rotation. The teeth on the second intermediate gear 144 mesh with the teeth on a transmission gear 146 that is rotationally fixed to an output gear 148 by means of an output drive shaft 147. The drivetrain cover 112 further includes a second cylindrical flange having an interior bearing surface 134 (FIG. 2A) that receives an exterior bearing surface 134' (FIG. 2E) on the transmission gear 146 to stabilize its rotation.

Referring to FIG. 2E, the transmission gear 146 (which can be referred to as a "freewheel gear 146") may be mounted to the output drive shaft 147 (FIG. 2A) with a clutch 145 operably coupled therebetween. The clutch 145 can be a roller bearing clutch, a sprag clutch, a spiral clutch, a diode clutch, a controllable mechanical diode (CMD) clutch, etc., that can be operated by one or more of a spring, hydraulic pressure, a solenoid, a magnet, etc., and may be user-selectable. In operation, the clutch 145 can engage and disengage the rotational power transmission between the freewheel gear 146 and the output drive shaft 147 such that, when the clutch 145 is actuated, the freewheel gear 146 is free to rotate on the output drive shaft 147, thereby enabling the output gear 148, which is fixedly attached to the output drive shaft 147, to rotate freely with respect to the freewheel gear 146 (e.g., during coasting, during pedaling without power-assist, etc.). In other embodiments, the clutch 145 may be associated with any of the gears 140, 142, 144, and 148. In some embodiments, the clutch 145 can be automatically engaged and disengaged based on the direction of rotation of the gears (e.g., rotation of the transmission gear 146), or can be controlled, either by the user with a manual input (e.g., with a switch when the user desires to have the clutch disengaged to freewheel the system), or by an electronic signal (e.g., when the drive gear assembly 100 determines that freewheeling is appropriate based on a programming routine of a speed controller, the pedal sensor signal, the motor hall sensor signal, etc.).

The output drive gear 148 includes output teeth 149 (FIGS. 2B and 2C) configured to interface (e.g., mesh) with driven teeth 224 of the driven gear 220 to transmit rotational power to the driven gear assembly 200 and accordingly to the rear wheel 18 of the bicycle 10. The output drive gear 148 is coupled to the output drive shaft 147 with a fastener 138a (e.g., a bolt or screw) and a washer 138b (FIG. 2A). In some embodiments, the gears 140, 142, 144, 146, and 148 may be suitably heat treated and hardened and include anti-rotation and/or clocking features (e.g., woodruff keys, splines, etc.) configured to be received in keyways on the corresponding mounting shafts and transmit rotation between the components by mechanical interference. The gears of the drive unit assembly 100 and the driven unit assembly 200 can be formed from nylon, stainless steel, aluminum (e.g., 2024, 7075, etc.), Polyether ether ketone (PEEK), heat treated carbon steel, and/or other suitable materials. Depending on the material, the gears can receive various heat treatments and/or include hardened surface coatings (carbon, titanium nitride, anodizing, TEFLON® infusion, etc.), and can be formed by machining, forging, die casting, metal injection molding, etc.

The driven gear assembly 200 includes the brake disc 210 coupled to the driven gear 220 with threaded fasteners 212a (e.g., bolts) and nuts 212b. Although a single fastener 212a and nut 212b pair is shown in FIG. 2A, in the illustrated embodiment, six pairs of fasteners 212a and nuts 212b are used to couple the brake disc 210 to the driven gear 220 in the illustrated embodiment. The driven gear 220 is coupled to the wheel hub 230 with fasteners 222 (e.g., bolts). Similarly, in the illustrated embodiment, six fasteners 222 are used to couple the driven gear 220 to the wheel hub 230. In other embodiments, other types of fasteners and/or numbers of fasteners can be used to attach the brake disc 210, driven gear 220, and wheel hub 230 together. As shown, e.g., FIG. 2A, the brake disc 210 may include vents 211 configured to cool the brake disc 210 and/or clean the brake pads (not shown) in the brake caliper assembly 108. In other embodiments, any shape or vent configuration of the brake disc 210 (or no vents) is within the scope of the present technology, such as round holes, grooves, surface troughs, and/or the omission of any vents in the brake disc 210. The driven gear 220 includes spokes 221 connecting the outer surface of the driven gear 222 to its central hub where the fasteners 222 are received. In further embodiments, the brake disc 210 and the driven gear 220 may be a single unitary piece couplable to the wheel hub 230, or may have any other suitable configuration, such as gear teeth on the outer or inner perimeter of the brake disc, gear teeth on or adjacent a side or braking surface of the disc 210 adjacent to the outer surface of the driven gear 220, etc. In some embodiments, the driven gear 220 can be integral with the wheel hub 230 (e.g., formed as a single unitary piece with the wheel hub 230.) In some embodiments, the final drive gearing of the drive unit assembly 100 and the driven gear assembly 200 may be between about 20:1 and 50:1, e.g., between about 20 and 50 rotations of the pinion gear 140 causes one rotation of the driven gear 220. In other embodiments, the final drive gearing of the drive unit assembly 100 and the driven gear assembly 200 may be between about 24:1 and 40:1, and in further embodiments about 30:1.

Figure 3A:
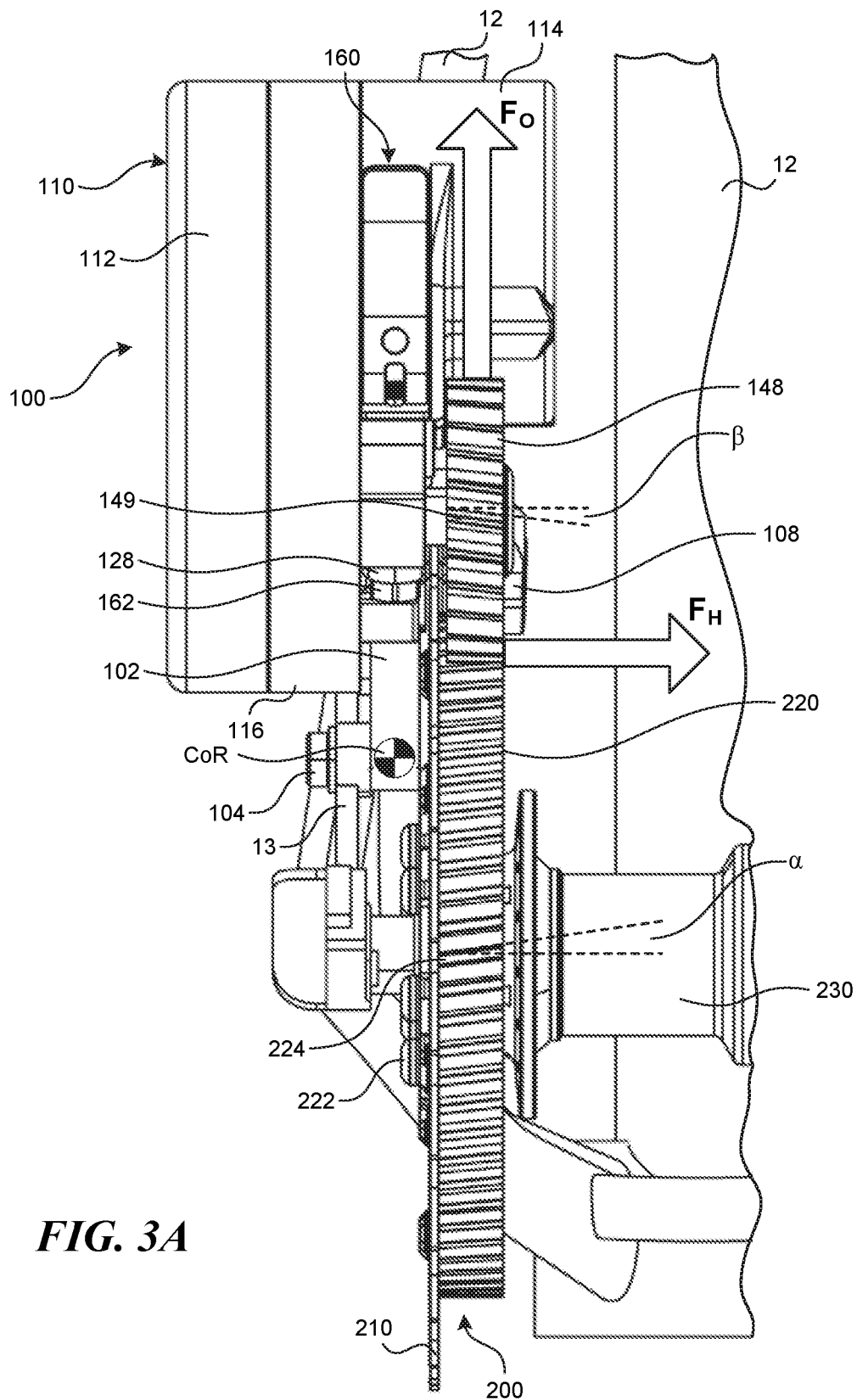
FIGS. 3A and 3B are rear views of the drive unit assembly and the driven unit assembly of FIGS. 2A-2E.
Figure 3B:
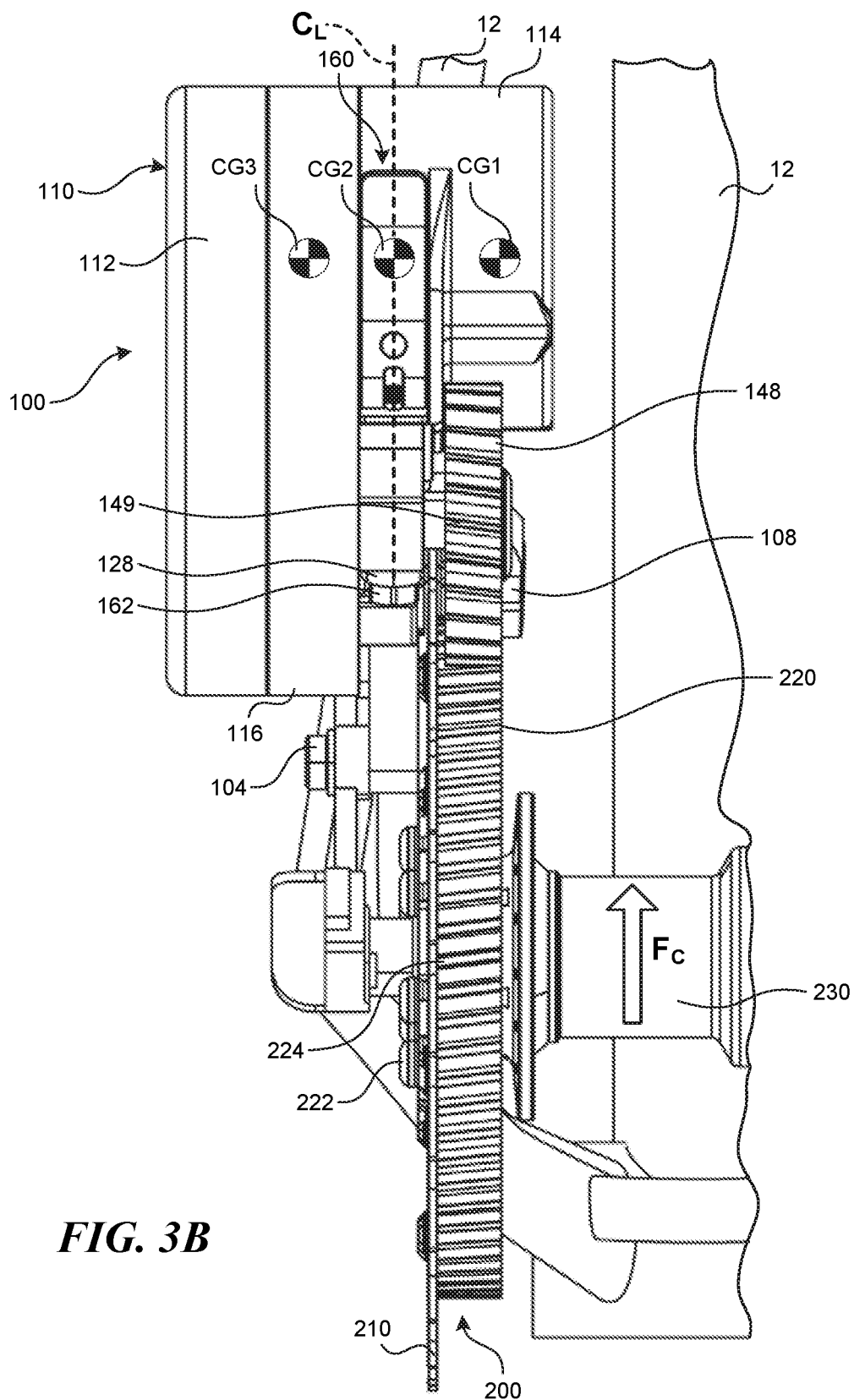

FIGS. 3A and 3B show rear views of the drive unit assembly 100 mounted to the bicycle 10 and operably coupled to the driven gear assembly 200. Referring to FIG. 3A, when power is applied by the motor 118, the interaction between the teeth on the drive gear 148 and the teeth on the driven gear 220 generates an opening force $F_O$ that creates a bending moment and stress on components in the load path between the drive unit 110 and the frame 12. Such rotational bending about the longitudinal axis of the bicycle 10 can lead to premature failure of components of the drive unit assembly 100. The teeth 149 of the drive gear 148 and the teeth 224 of the driven gear 220 are shown with helical angles β and α, respectively. In the illustrated embodiment, the direction of the helical mesh of teeth 149 and 224 is configured to counteract the bending forces about the frame bracket 102 and flange 13 caused by the gear opening force $F_O$. More specifically, the angles β and α have been selected to create a helical mesh thrust force FH causing a bending moment about a center of rotation CoR on the frame bracket 102 that is opposite to the bending moment about the CoR caused by the opening force $F_O$ to counteract and reduce or eliminate the net bending forces about the longitudinal axis of the bicycle 10 at the frame bracket 102 and the flange 13. The force balance can be calculated using a reaction force body diagram and is determined by variety of design factors, including helical pitch diameters, normal pressure angles, helical gear angle, applied forces, center of gravity of the drive unit, frame and bracket mounting locations, drive gear offset distance, etc.

In another embodiment, rotational bending can be counteracted by only partially meshing the drive gear 148 and the driven gear 220 under light to nominal loads by having the gear teeth tapered. Then, under heavier load, the deflection will result in a standard mesh due to the deflection of the tapered/conical gears (e.g., spur or helical) during maximum torque transfer. The gears in such a configuration may have higher efficiency at lighter loads with less surface area in contact.

Referring to FIG. 3B, the drive unit assembly 100 is shown with a mounting centerline $C_L$ extending from mounting apertures 103 (FIG. 2A) in the frame bracket 102 through the axial centers of the quick connect couplings 162a, b and the quick connect assemblies 160a, b. Illustration of the centerline $C_L$ can be used to determine the direction of the bending forces exerted on the drive unit assembly 100 during a compression force Fc experienced, e.g., when the bicycle 10 hits a bump. In a first configuration, if the center of gravity (CoG) of the drive unit assembly 100 is positioned to the right of the centerline $C_L$, as shown in FIG. 3B as CG1, the force based on acceleration of the CoG will cause reaction bending forces tending to close the interface between the drive gear 148 and the driven gear 220, the contact of which prevents the bending forces from acting on the frame bracket 102 and the flange 13. In a second configuration, if the CoG of the drive unit assembly 100 is positioned aligned with the centerline $C_L$ as shown in FIG. 3B as CG2, the force based on acceleration of the CoG will be aligned with the centerline $C_L$ and no reaction bending forces will be exerted on the drive unit assembly 100. In a third configuration, if the CoG of the drive unit assembly 100 is positioned to the left of the centerline $C_L$, as shown in FIG. 3B as CG3, the force based on acceleration of the CoG will cause reaction bending forces tending to open the interface between the drive gear 148 and the driven gear 220, which will exert a bending force on the frame bracket 102 and the flange 13. As noted above, such rotational bending about the longitudinal axis of the bicycle 10 can cause failure of components of the drive unit assembly 100.

Figure 4A:
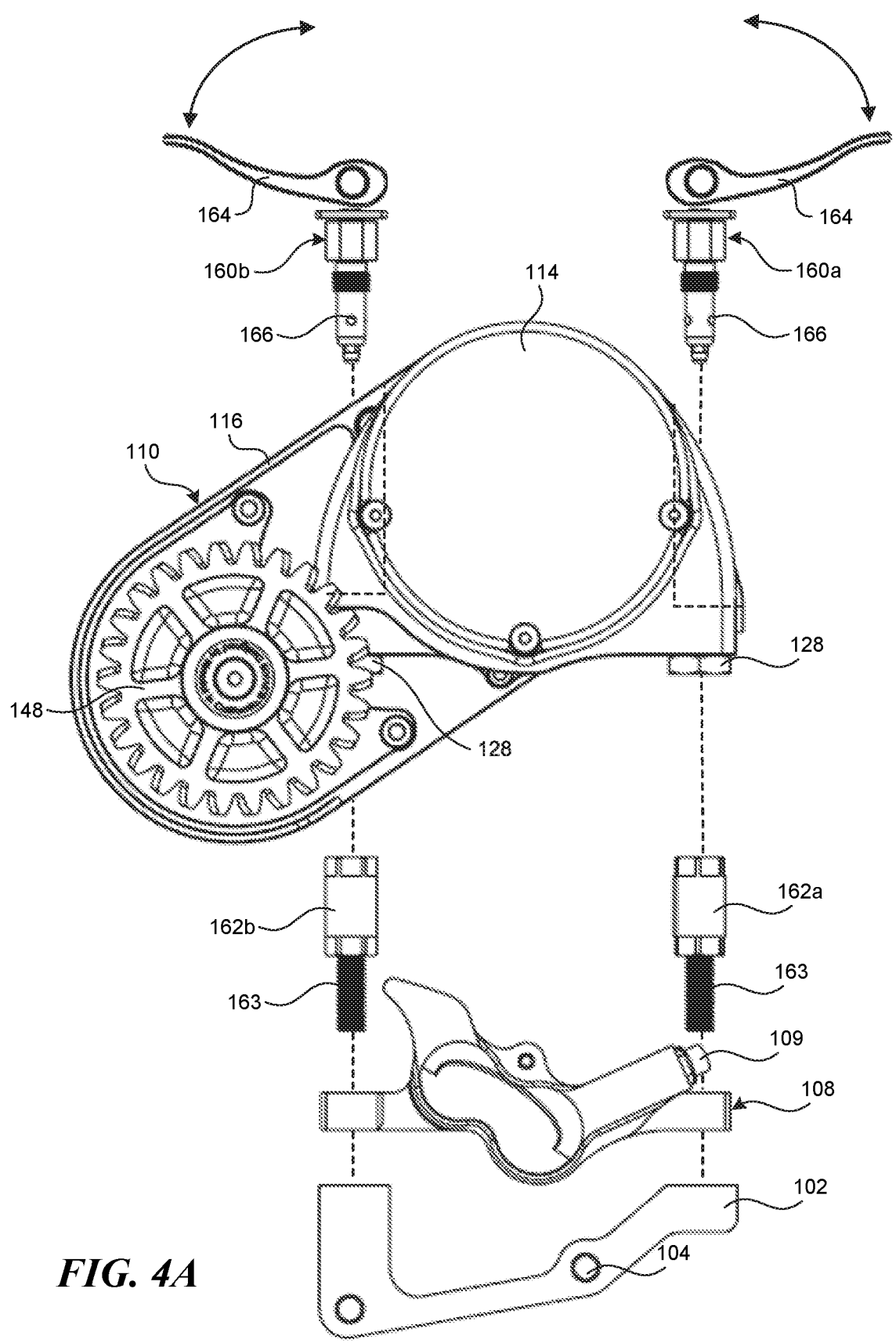
FIG. 4A is a partially exploded right side view of the drive unit assembly of FIGS. 2A-2E, illustrating a quick-connect system.
Figure 4B:
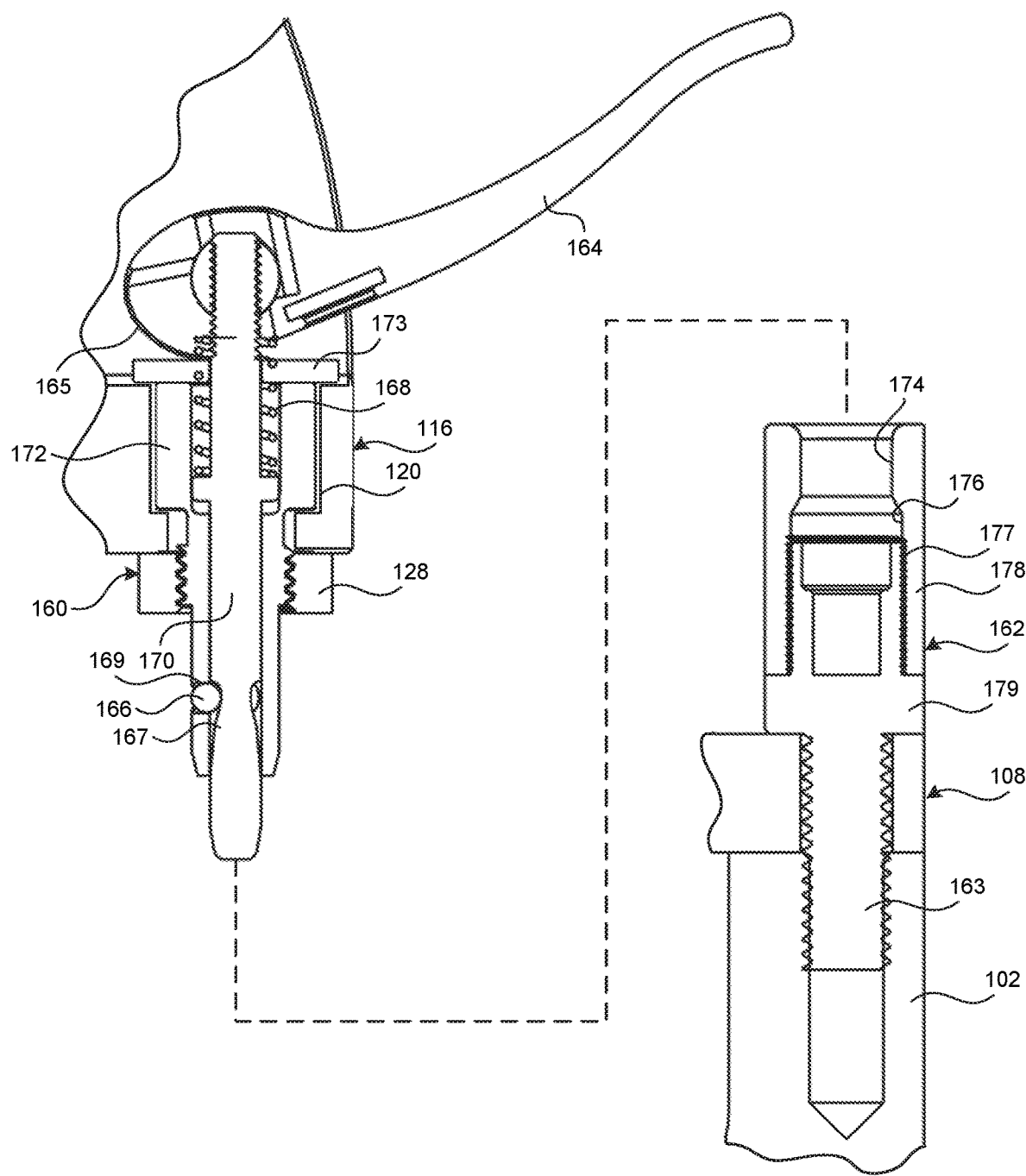
FIGS. 4B and 4C are right side views of the quick-connect system before and after connection, respectively.
Figure 4C:
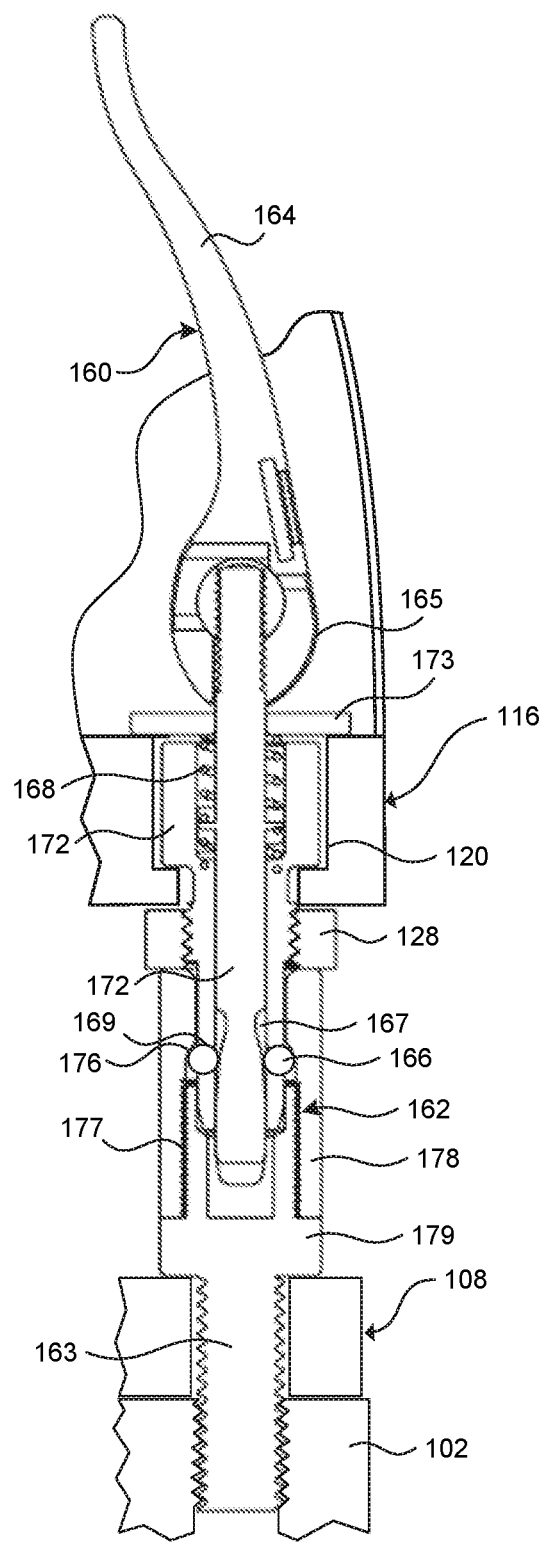

FIG. 4A is a partially exploded view of the drive unit assembly 100 of FIGS. 2A-2E, showing a quick-connect system configured for attachment of the drive unit assembly 100 to the mounting bracket 102, and FIGS. 4B and 4C are partially exploded and assembled views, respectively, of the quick connect system. Referring first to 4A, the quick connect system includes the quick connect assemblies 160a, b, which each include a cam lever 164 operably associated with two or more (e.g., three) locking balls 166. The quick connect assemblies 160a, b are configured to be received within the first and second drive unit apertures 120 and 122, respectively, of the drive unit 110 (FIG. 2A). As described above, the drive unit 110 may include the two nuts 128 having threads to engage a threaded portion of the quick connect assemblies 160a, b such that the quick connect assembly 160 is securely coupled to the drive unit 110 as shown in FIG. 4B. As described in more detail below, rotation of cam levers 164 to the position shown in FIG. 4A releases the locking balls 166 from the corresponding quick connect couplings 162a, b, such that the drive unit 110 and quick connect assemblies 160a, b can be removed from the bicycle 10 as an assembled unit. The quick connect couplings 162a, b include a threaded shank 163 that extends through the corresponding apertures 108a (FIG. 2A) in the caliper 108 and engages the mounting apertures 103 in the mounting bracket 102 to securely attach the quick connect couplings 162a, b and the caliper 108 to the frame bracket 102.

Referring next to FIGS. 4B and 4C, the quick connect assemblies 160a, b include a shaft 170 that extends coaxially through a body 172 and is axially translatable by rotating the cam lever 164 to lock and unlock the quick connect assembly 160 from the quick connect coupling 162. As noted above, the body 172 can be threadably engaged with the nut 128 to secure the drive unit 110 to the quick connect assembly 160 by clamping the housing 116 between the nut 128 and a washer 173 positioned at the opposite end of the body 172. In other embodiments, the nut 128 may be omitted and the body 172 can be threadably engaged with the housing 116, bonded to the housing 116 using adhesive, or any other suitable attachment of the body 172 to the housing 116. The shaft 170 includes an inwardly tapering ramp portion 167 configured to radially translate the locking ball 166 within a locking ball aperture 169. The shaft 170 may further include a biasing member, (e.g., a spring 168) having a biasing force tending to keep an unlocked cam lever 164 in the unlocked position (e.g., the position shown in FIG. 4B), and to keep a locked cam lever 164 in the locked position (e.g., the position shown in FIG. 4C) based on a centered or an over-center rotation position of the cam lever 164 in the locked position (FIG. 4C generally shows a centered position). In this regard, the cam lever 164 includes an eccentric cam surface 165 that is configured to translate the shaft 170 upward as the cam lever 164 is rotated from the unlocked position (FIG. 4B) to the locked position (FIG. 4C).

The quick connect couplings 162a, b include an upper portion 178 and a lower portion 179. The upper portion 178 includes a cylindrical bore 174 configured to receive the housing 172 and the shaft 170 of the quick connect assembly 160. The bore 174 includes a locking cavity 176 configured to interface with the locking ball 166 to lock the quick connect assembly 160 to the quick connect coupling 162 when the cam lever 164 is in the locked position (FIG. 4C). The lower portion 179 includes the threaded shank 163 is configured to threaded into the frame bracket 102 and clamp the brake caliper assembly 108 therebetween. The position of the upper portion 178 with respect to the lower portion 179 can be adjusted (e.g., with threads 177) to change the mounting height of the drive unit assembly 100 relative to the frame 12. Such adjustability can be used to adapt the system to accommodate a variety of frames and ensure proper meshing of the output drive gear 148 and the driven gear 220. In some embodiments, shims, washers, or other adjustment means can be used to adjust the height of the drive unit assembly 100 relative to the frame 12 as necessary.

As shown in FIG. 4C, when the quick connect assembly 160 is inserted into the quick connect coupling 162 and the cam lever 164 is rotated into the locked position shown, the eccentric cam surface 165 causes the shaft 170 to translate upward, compressing the spring 168. Based on the translation of the shaft 170, the ramp portion 167 drives the locking balls 166 radially outward and into an interference position with the locking cavity 176 to lock the quick connect assembly 160 to the quick connect coupling 162. When the cam lever 164 is rotated downwardly into the unlocked position (FIG. 4B), the eccentric cam surface 165 causes the shaft to translate downward, releasing the spring 168. Based on the translation of the shaft 170, the ramp portion 167 allows the locking balls 166 to translate radially inward, by the slope of the locking cavity 176, and out of the interference position with the locking cavity 176 to unlock the quick connect assembly 160 from the quick connect coupling 162. In the illustrated embodiment, three locking balls 166 are used to lock the components of the quick connect system; however, in other embodiments any number of locking balls 166 are suitable for use to lock the components of the quick connect system.

Figure 5:
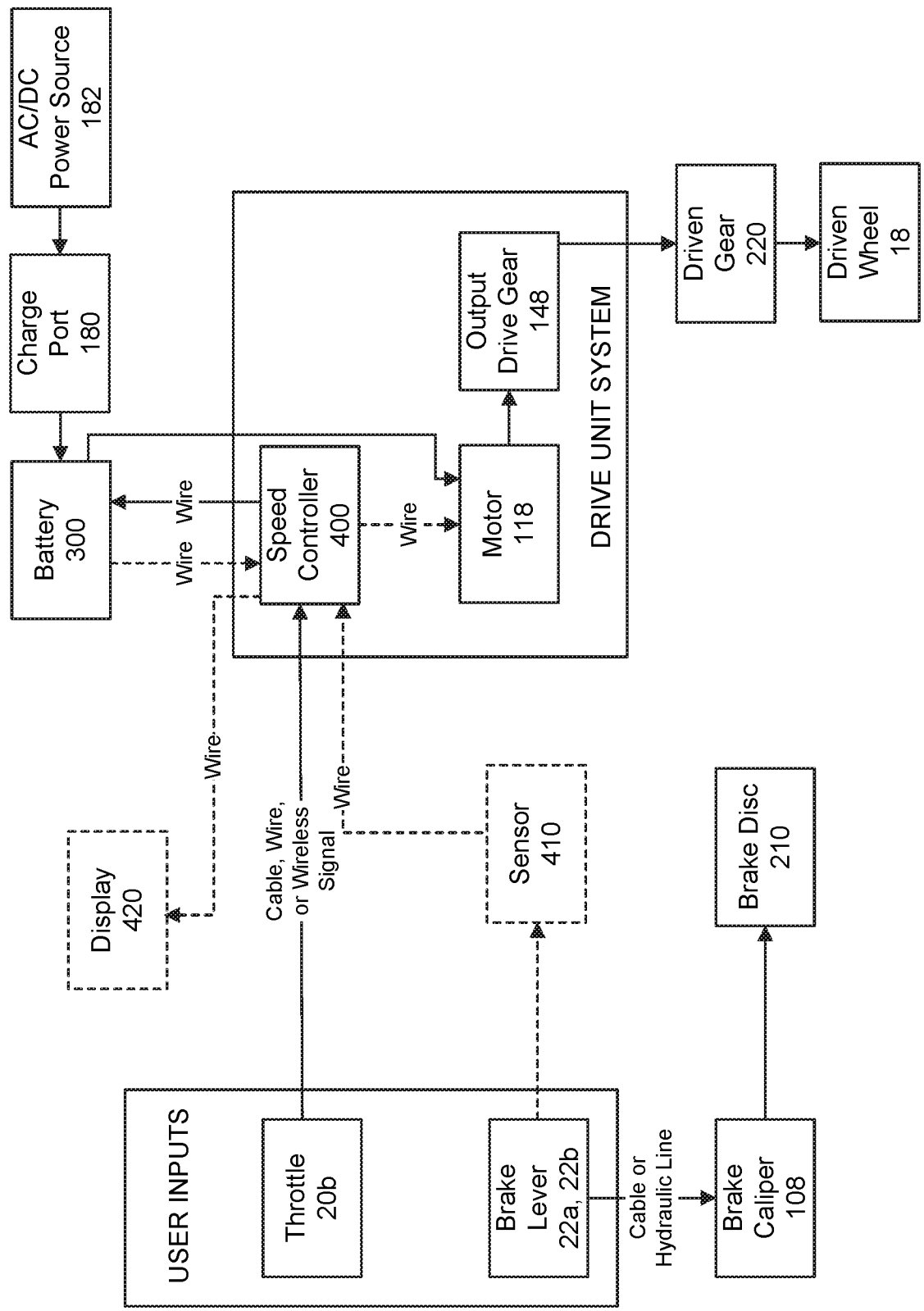
FIG. 5 is a schematic diagram of a vehicle having a power-assist drive system configured in accordance with embodiments of the present technology.

FIG. 5 is a schematic diagram of a vehicle (e.g., the bicycle 10) having the power-assist drive system of FIGS. 1A and 1B configured in accordance with embodiments of the present technology. The user inputs include the throttle 20b and the brake lever 22b. The throttle 20a is in communication with a speed controller 400 by any suitable connection, such as a push-pull cable, electrical wire, or wireless signal. The speed controller 400 may be optionally connected to a display 420 configured to display information for the user, such as battery charge percentage, power-assist intervention, range, speed, location, etc. The brake lever 22b may be optionally associated with a sensor 410 that transmits a signal through an electrical wire to the speed controller 400 when the brake lever 22b is actuated. When a brake actuation is sensed by the sensor 410, the speed controller 400 may use that signal to cut power to the drive unit system gradually or immediately to assist the user in braking of the bicycle 10, and in some embodiments may initiate power regeneration by reversing the polarity of the motor 118 to generate power and provide resistance for further braking assistance. As shown, the brake lever 22b is in further communication with the brake caliper 108 through a push-pull cable or hydraulic line, which accordingly clamps onto the brake disc 210 to control the speed of the bicycle 10.

The speed controller 400 is in communication through an electrical wire to the battery 300. In some embodiments, the speed controller 400 may be collocated with the motor 118. When the speed controller 400 receives a signal from the throttle 20b, the speed controller 400 supplies power to the motor 118 of the drive unit system, which transmits rotational power through the drivetrain (e.g., the gears 140, 142, 144, and 146, see FIGS. 2A-2E) to the output drive gear 148 and accordingly to the driven gear 220 and the driven wheel 18. Although the battery 300 is shown in direct electrical communication with the motor 118, in other embodiments, the electrical power from the battery 300 can travel first to the speed controller 400 and then to the motor 118 in electrical communication with the speed controller 400, as denoted by the broken line path from the battery 300 to the speed controller 400 to the motor 118. The drive unit system may include a charge port 180 configured to receive electrical power from, e.g., an external power source, such as an AC/DC power source 182, and supply electrical power to charge the battery 300. During operation, the user inputs a desired speed, torque, and/or power-assist level via the throttle 20b, which sends a signal to the speed controller 400. The speed controller 400 sends a signal to the battery 300, which provides electrical power to the motor 118 to modulate speed, torque, or total power. Alternatively, the speed controller 400 directs power from the battery 300 through the speed controller 400 and to the motor 118. The motor 118 rotationally drives the output drive gear 148, which meshes with and drives the driven gear 220 and the wheel 18. If the user actuates the brake levers 22a and/or 22b, the optional sensor 410 can send a signal to the speed controller 400 to cut or reduce the power-assist accordingly.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A vehicle power-assist drive system, comprising:
   a drive unit assembly configured to be attached to a frame of a vehicle, the drive unit assembly including—
      a motor including an output shaft;
      a pinion gear coupled to the output shaft of the motor;
      a drive gear rotatably associated with the output shaft; and
      a reduction gearset positioned between the pinion gear and the drive gear, wherein the reduction gearset is configured to reduce a rotational speed of the drive gear relative to a rotational speed of the output shaft; and
   a driven unit assembly including—
      a driven gear configured to be attached to a wheel hub of the vehicle; and
      a brake disc coaxially attached to the driven gear;
      wherein the drive gear is configured to operably engage the driven gear to transmit power from the motor to the wheel hub.

2. The vehicle power-assist drive system of claim 1, wherein the drive unit assembly further comprises a brake caliper, wherein the brake caliper is configured to frictionally interface with the brake disc to counteract rotational motion of the wheel hub.

3. The vehicle power-assist drive system of claim 1, wherein the drive unit assembly further comprises a clutch configured to selectively couple the pinion gear to the drive gear.

4. The vehicle power-assist drive system of claim 3, further comprising a freewheel gear positioned between the reduction gearset and the drive gear, the freewheel gear coupleable to the drive gear via the clutch.

5. The vehicle power-assist drive system of claim 3, further comprising a user-selectable control configured to actuate the clutch to selectively couple the pinion gear to the drive gear.

6. The vehicle power-assist drive system of claim 1, wherein the drive unit assembly includes a bracket configured to be fixedly attached to the frame, wherein the brake disc is arranged outboard of the driven gear.

7. The vehicle power-assist drive system of claim 2, wherein the drive unit assembly includes a bracket configured to be fixedly attached to the frame, wherein the brake caliper is arranged between the motor and the bracket.

8. The vehicle power-assist drive system of claim 1, wherein the drive unit assembly further includes:
   a quick-connect assembly threadably coupled to the drive unit assembly, the quick-connect assembly including a cam lever pivotally attached to a shaft extending coaxially through a body, the cam lever having an eccentric cam surface configured to axially translate the shaft upon rotation of the cam lever, wherein translation of the shaft causes radial translation of a locking ball adjacent to the shaft; and
   a quick-connect coupling threadably coupled to the frame, the quick-connect coupling including a bore having a locking cavity and configured to receive the body of the quick-connect assembly therein,
   wherein outward radial translation of the locking ball in response to axial translation of the shaft moves the locking ball into engagement with the locking cavity to prevent removal of the shaft from the bore when the cam lever is in a first position.

9. The vehicle power-assist drive system of claim 1, wherein the brake disc and the driven gear are a unitary component.

10. The vehicle power-assist drive system of claim 1, wherein the brake disc is removably coupled to the driven gear.

11. The vehicle power-assist drive system of claim 1, further comprising:
a battery electrically coupled to the motor; and
a speed controller in electrical communication with the battery and the motor, wherein the speed controller is configured to receive an input signal used to selectively direct electrical power to the motor.

12. The vehicle power-assist drive system of claim 1, wherein the drive unit assembly is operably associated with at least one of a seat stay, a chain stay, or a front fork.

13. A power-assist drive system for use with a bicycle, comprising:
a drive unit assembly configured to be removably coupled to the bicycle, the drive unit assembly including—
a motor including an output shaft;
a pinion gear coupled to the output shaft of the motor;
a drive gear rotationally associated with the output shaft;
a reduction gearset positioned between the pinion gear and the drive gear, wherein the reduction gearset is configured to reduce a rotational speed of the drive gear relative to a rotational speed of the output shaft; and
a brake caliper;
a battery electrically connectable to the motor;
a driven unit assembly configured to be operably coupled to a wheel of the bicycle, the driven unit assembly including—
a driven gear fixedly attachable to a hub of the wheel and configured to operably engage the drive gear; and
a brake disc coaxially attached to the driven gear, the brake disc including a friction surface configured to be movably received by the brake caliper; and
a speed controller, wherein the speed controller is configured to receive an input signal to selectively direct electrical power from the battery to the motor to drive the wheel via the drive gear and the driven gear.

14. The vehicle power-assist drive system of claim 13, wherein the drive unit assembly is configured to be removably couplable to at least one of a frame of the bicycle or a fork of the bicycle.

15. The vehicle power-assist drive system of claim 14, wherein the drive unit assembly is configured to be operably coupled to a seat stay or a chain stay of the frame.

16. The vehicle power-assist drive system of claim 13, wherein:
the driven unit assembly is attached to a rear wheel of the bicycle; and
the drive unit assembly is configured to drive the rear wheel.

17. The vehicle power-assist drive system of claim 13, wherein:
the drive unit assembly is removably couplable to a stanchion of a fork attached to a frame of the bicycle; and
the wheel is a front wheel of the bicycle.

18. The vehicle power-assist drive system of claim 13, wherein the wheel is a rear wheel, and wherein:
the drive unit assembly is a first drive unit assembly configured to be removably coupled to a seat stay or a chain stay of a frame of the bicycle;
the driven unit assembly is a first driven unit assembly configured to be operably coupled to the rear wheel of the bicycle;
the bicycle further includes:
a second drive unit assembly configured to be removably coupled to a fork attached to the frame; and
a second driven unit assembly configured to be operably coupled to a hub of a front wheel of the bicycle; and
the speed controller is configured to receive the input signal to selectively direct electrical power from the battery to drive the rear wheel via the first drive unit assembly and drive the front wheel via the second drive unit assembly.

19. The vehicle power-assist drive system of claim 18, wherein the rear wheel and the front wheel are driven simultaneously.

20. The vehicle power-assist drive system of claim 13, wherein the brake caliper carries one or more pads configured to frictionally interface with the friction surface of the brake disc to counteract rotational motion of the wheel.

21. A power-assist drive system for use with a bicycle, comprising:
a first drive unit assembly configured to be removably coupled to a seat stay or a chain stay of a frame of the bicycle;
a second drive unit assembly configured to be removably coupled to a fork attached to the frame;
a first driven unit assembly configured to be operably coupled to a rear wheel of the bicycle;
a second driven unit assembly configured to be operably coupled to a hub of a front wheel of the bicycle;
a battery electrically connectable to at least one of the first drive unit assembly and the second drive unit assembly; and
a speed controller,
wherein the speed controller is configured to receive an input signal to selectively direct electrical power from the battery to drive the rear wheel via the first drive unit assembly and drive the front wheel via the second drive unit assembly, and
wherein the rear wheel and the front wheel are driven simultaneously, and the rear wheel is driven with a greater power than the front wheel.

22. A power-assist drive system for use with a bicycle, comprising:
a first drive unit assembly configured to be removably coupled a seat stay or a chain stay of a frame of the bicycle;
a second drive unit assembly configured to be removably coupled to a fork attached to the frame;
a first driven unit assembly configured to be operably coupled to a rear wheel of the bicycle;
a second driven unit assembly configured to be operably coupled to a hub of a front wheel of the bicycle;
a battery electrically connectable to at least one of the first drive unit assembly and the second driver unit assembly; and
a speed controller,
wherein the speed controller is configured to receive an input signal to selectively direct electrical power from the battery to drive the rear wheel via the first drive unit assembly and drive the front wheel via the second drive unit assembly, and wherein the rear wheel and the front wheel are driven independently.

23. A power-assisted vehicle, comprising:

a frame;

a wheel rotatably supporting the frame;

an electric motor operably mounted to the frame and including an output shaft;

a pinion gear coupled to the output shaft of the electric motor;

a drive gear operably coupled to the pinion gear;

a reduction gearset positioned between the pinion gear and the drive gear, wherein the reduction gearset is configured to reduce a rotational speed of the drive gear relative to a rotational speed of the output shaft;

a brake caliper operably coupled to the frame;

a driven gear fixedly attached to a hub of the wheel and operably engaged with the drive gear; and a brake disc positioned coaxially adjacent to the driven gear and configured to frictionally interface with the brake caliper, wherein operation of the electric motor rotationally drives the wheel via the transmission of power from the drive gear to the driven gear.

24. The power-assisted vehicle of claim 23, further comprising:

a battery electrically connected to the motor; and a speed controller in electrical communication with at least one of the battery and the motor, wherein the speed controller is configured to receive an input signal from a user and variably direct electrical power to the motor.

25. The power-assisted vehicle of claim 23, wherein the brake disc is integral to the driven gear.

26. The power-assisted vehicle of claim 23, wherein the brake disc is fixedly attached to the driven gear.

27. A power-assisted vehicle, comprising:

a frame;

a wheel rotatably supporting the frame;

an electric motor operably mounted to the frame;

a drive gear operably coupled to the electric motor;

a brake caliper operably coupled to the frame;

a driven gear fixedly attached to a hub of the wheel and operably engaged with the drive gear; and a brake disc positioned coaxially adjacent to the driven gear and configured to frictionally interface with the brake caliper, wherein the brake disc and the driven gear are formed from a single piece of material, and wherein operation of the electric motor rotationally drives the wheel via the transmission of power from the drive gear to the driven gear.

28. The power-assisted vehicle of claim 23, wherein the frame includes a front fork and the wheel is rotatably mounted to the front fork, and wherein the electric motor, the drive gear, and the brake caliper are mounted to the front fork.

29. The power-assisted vehicle of claim 23, wherein the frame includes a seat stay, and wherein the electric motor, the drive gear, and the brake caliper are mounted to the seat stay.

30. The power-assisted vehicle of claim 23, wherein the electric motor is mounted to a housing and the brake caliper is coupled to the housing.

31. The power-assisted vehicle of claim 30, wherein the drive gear is rotatably coupled to the housing.

32. The power-assisted vehicle of claim 23, wherein the frame includes an integral housing, and wherein the electric motor is mounted to the housing.

* * * * *